June 23, 1942.  A. W. BUCKNER  2,287,414
CABLE CLAMP
Filed June 1, 1940
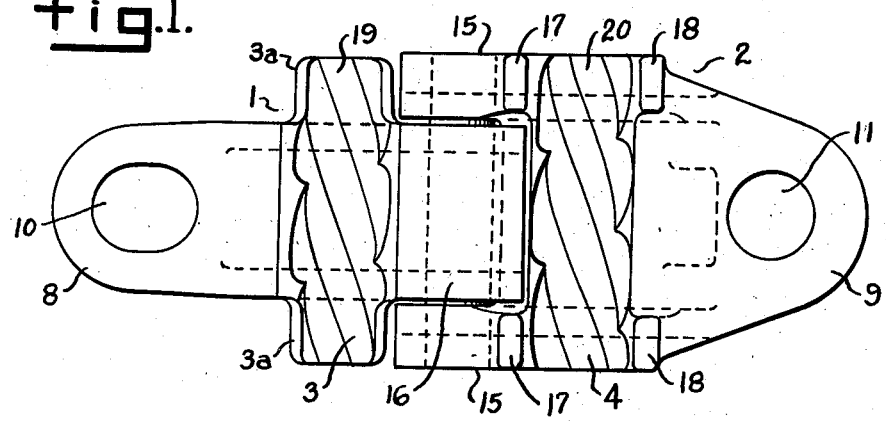
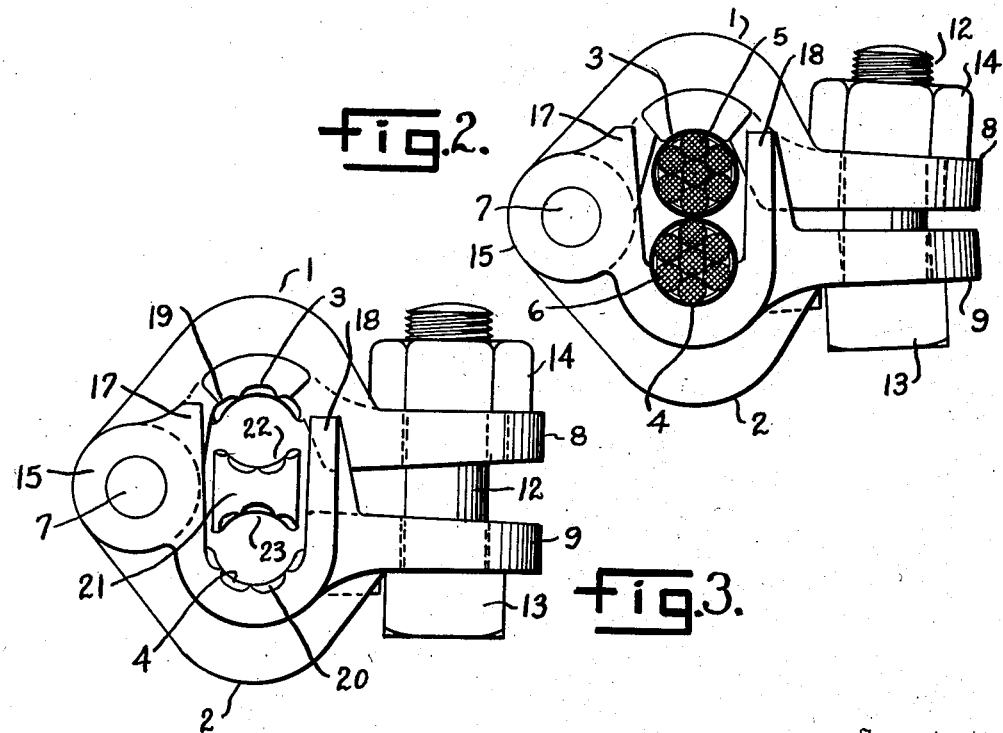
Inventor
ARTHUR W. BUCKNER
By E. V. Hardway
Attorney Patented June 23, 1942

2,287,414

UNITED STATES PATENT OFFICE 2,287,414

CABLE CLAMP

Arthur W. Buckner, Houston, Tex.

Application June 1, 1940, Serial No. 338,315

2 Claims. (Cl. 24—132)

This invention relates to a cable clamp.

An object of the invention is to provide a novel type of clamp which will securely clamp cables, such as wire cables, together.

Another object of the invention is to provide a cable clamp embodying a pair of clamp members having cable clamping jaws with maximum gripping area which may be quickly and easily applied to the cable and of such construction that the cable ends in the clamp will be securely held against slippage.

Another object of the invention is to provide a cable clamp of this character having cooperating clamp members which are hinged together at one end and which are formed at their other ends for the reception of a clamp bolt whereby the clamp members may be effectively drawn together to securely clamp the cable ends between them, said clamps being provided with elongated jaws of a contour to efficiently grip cables such as wire cables.

It is another object of the invention to provide a cable clamp of the character described having an intermediate spacer adapted to be inserted between the clamped portions of the cable, said spacer having oppositely disposed jaws which confront the clamp jaws whereby to provide a greater gripping area and to prevent the clamped ends of the cable from coming into direct contact with each other and being distorted and thus weakened.

Another object of the present invention is to provide a cable clamp which is of very simple construction, may be cheaply and easily produced and which is very efficient in use.

The invention herein described contains certain important improvements over that type of cable clamp disclosed in Patent No. 2,185,723 issued by the United States Patent Office to the present applicant on January 2, 1940.

With the above and other objects in view the invention has particular relation to certain novel features of construction, arrangement of parts and use, an example of which is given in this specification and illustrated in the accompanying drawing, wherein:

Figure 1 shows a plan view of the inside of the clamp with the clamp shown in open position.

Figure 2 shows a side elevational view of the cable clamp illustrating also the cable clamped therein, and Figure 3 shows a side elevational view of another embodiment.

Referring now more particularly to the drawing wherein like numerals of reference designate the same parts in each of the figures, the numerals 1, 2 designate the clamp members having intermediate jaw portions 3, 4 at their inner sides which are arcuate in general contour providing recesses for accommodating the cable ends 5, 6. The clamp members 1, 2 are hinged together at one end by means of a hinge pin 7 and are provided at their other ends with the ears 8, 9 which are provided with bolt holes 10, 11, the former being slightly elongated, for the reception of a clamp bolt 12 which has a head 13 on one end and a nut 14 screwed onto the other end. Obviously by tightening the nut 14 the clamp members 1, 2 will be drawn together so as to securely clamp the cables 5, 6 between them. As more clearly shown in Figure 1 the clamp member 2 is of a substantially plate-like form and is comparatively wide and is formed at one end with the aligned pin bearings 15, 15, while the clamp member 1 is formed at its pivoted end with a single pin bearing 16 of a width to fit snugly between the bearings 15, 15. The hinge pin 7 is inserted through the aligned bearings 15, 16 as also clearly shown in Figure 2,.

The clamp member 2 is provided with inwardly projecting parallel horns 17, 17 on each of its bearings 15 at one side of the jaw 4 and formed on said clamping member 2 at the opposite side of the jaw 4 are the inwardly projecting horns 18, 18.

In use the cable 6 may be placed between the horns 17, 18 on the jaw 4 and then the other cable, or the cable end 5, is disposed on the cable 6 between said horns 17, 18 and will be maintained therein in proper position while the clamp member 1 is swung into clamping relation with the cable end 5 and connected by the bolt 12 with the clamp member 2. The nut 14 is then applied and tightened so as to securely clamp the cables together in proper parallel contiguous relation overlapped one by the other.

It will be noted from an inspection of Figure 1 that the jaw 3 is extended each way forming the extensions 3a, 3a which fit between the horns 17, 18 when the cable clamp is applied to and secured about the cables. This gives to the clamp member 1 a maximum cable-gripping area, and holds the clamp members aligned.

The jaws 3, 4 are formed with spiralled grooves as 19, 20 to receive the adjacent strands of the cables to give a better gripping effect.

In the embodiment illustrated in Figure 3 an independent spacer 21 is provided which is to be inserted between the two cables clamped by the jaws. This spacer holds the cables apart to minimize the distortion of the cables which are clamped together. This spacer has oppositely disposed arcuate jaws 22, 23 confronting the corresponding jaws 3 and 4. The jaws 23, 24 have spiralled grooves corresponding with the confronting jaw grooves 19, 20 and for the same purpose.

The drawing and description are illustrative merely, while the broad principle of the invention will be defined by the appended claims.

What I claim is:

1. A cable clamp comprising a pair of clamp members having outwardly arched, intermediate jaws whose inner sides are recessed for accommodating cables to be clamped together, one of said clamp members being wider than the other and being provided, at one end, with spaced bearings located at its margins and having a pair of spaced horns at each of said margins, the horns of each pair being on opposite sides of said jaw, the other clamp member being of substantially uniform width throughout the major portion of its length and being of much greater width than thickness and having a single bearing fitted closely between said spaced bearings and of a length equal to the width of its clamp member and of a length greater than the total length of the spaced bearings, a pin extending through said bearings, the ends of said clamp members remote from said bearings being formed into ears having bolt holes therethrough which register when said clamp members are in clamping relation about a cable, the jaw of the narrower of said clamp members being extended each way forming side extensions which fit between the horns of the corresponding pairs when the clamp members are in clamping relation and whose ends are flush with the outer sides of the corresponding horns, a clamp bolt through the holes of said ears provided with a clamp nut whereby said clamp members may be drawn together to clamp a cable between them.

2. A cable clamp comprising a pair of clamp members having outwardly arched, intermediate jaws whose inner sides are recessed for accommodating cables to be clamped together, one of said clamp members being wider than the other and being provided, at one end, with spaced bearings located at its margins and having a pair of spaced horns at each of said margins, the horns of each pair being on opposite sides of said jaw, the other clamp member being of substantially uniform width throughout the major portion of its length and being of much greater width than thickness and having a single bearing fitted closely between said spaced bearings and of a length equal to the width of its clamp member and of a length greater than the total length of the spaced bearings, a pin extending through said bearings, the ends of said clamp members remote from said bearings being formed into ears having bolt holes therethrough which register when said clamp members are in clamping relation about a cable, the jaw of the narrower of said clamp members being extended each way forming side extensions which fit between the horns of the corresponding pairs when the clamp members are in clamping relation and whose ends are flush with the outer sides of the corresponding horns, a clamp bolt through the holes of said ears provided with a clamp nut whereby said clamp members may be drawn together to clamp a cable between them, a spacer shaped to be inserted between the cables clamped in the cable clamp and having arcuate cable-clamping jaws confronting the corresponding jaws of the clamp members, each of said jaws being spirally grooved and conformed to the shape of and to seat closely against the cables clamped therein.

ARTHUR W. BUCKNER.